US012330574B2

(12) United States Patent
Beach et al.

(10) Patent No.: US 12,330,574 B2
(45) Date of Patent: Jun. 17, 2025

(54) VEHICLE OCCUPANCY MONITOR

(71) Applicant: Alarm.com Incorporated, Tysons, VA (US)

(72) Inventors: Allison Beach, Leesburg, VA (US); Andrew Scanlon, Falls Church, VA (US); Matthew Daniel Correnti, Newtown Square, PA (US); Michael Kelly, Washington, DC (US); Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/232,535

(22) Filed: Aug. 10, 2023

(65) Prior Publication Data

US 2023/0382339 A1 Nov. 30, 2023

Related U.S. Application Data

(63) Continuation of application No. 17/550,103, filed on Dec. 14, 2021, now Pat. No. 11,766,977, which is a
(Continued)

(51) Int. Cl.
*B60Q 1/00* (2006.01)
*B60N 2/00* (2006.01)
(Continued)

(52) U.S. Cl.
CPC ...... *B60R 21/01512* (2014.10); *B60N 2/0022* (2023.08); *B60N 2/0025* (2023.08);
(Continued)

(58) Field of Classification Search
CPC . B60R 21/01512; B60R 16/023; B60N 2/002; B60N 2210/22; B60N 2210/30;
(Continued)

(56) References Cited

U.S. PATENT DOCUMENTS 6,480,103 B1 * 11/2002 McCarthy ................ B60Q 3/30
  73/23.3
6,737,975 B2 * 5/2004 Pelletier ............ B60R 21/01532
  340/573.1

(Continued)

*Primary Examiner* — Tai T Nguyen
(74) *Attorney, Agent, or Firm* — Fish & Richardson P.C.

(57) ABSTRACT

Methods, systems, and apparatus, including computer programs encoded on a storage device, for monitoring a vehicle are disclosed. A vehicle monitoring system for monitoring a vehicle includes one or more processors and one or more computer storage media storing instructions that are operable, when executed by the one or more processors, to cause the one or more processors to perform operations. The operations include: receiving, from a vehicle occupancy monitor and by the vehicle monitoring system, vehicle occupancy data that indicates presence of a vehicle occupant; receiving, by the vehicle monitoring system and from a sensor, sensor data that indicates an attribute of the vehicle; analyzing, by the vehicle monitoring system, the vehicle occupancy data and the sensor data; and based on analyzing the vehicle occupancy data and the sensor data, performing a vehicle monitoring system action.

19 Claims, 4 Drawing Sheets

Related U.S. Application Data continuation of application No. 16/900,258, filed on Jun. 12, 2020, now Pat. No. 11,230,246.

(60) Provisional application No. 62/866,277, filed on Jun. 25, 2019.

(51) Int. Cl.

| | | |
|---|---|---|
| *B60N 2/26* | (2006.01) | |
| *B60N 2/28* | (2006.01) | |
| *B60R 16/023* | (2006.01) | |
| *B60R 21/015* | (2006.01) | |
| *B60W 40/08* | (2012.01) | |
| *G06V 20/59* | (2022.01) | |
| *G08B 21/02* | (2006.01) | |

(52) U.S. Cl.
CPC ........... *B60N 2/0026* (2023.08); *B60N 2/267* (2023.08); *B60N 2/274* (2023.08); *B60N 2/28* (2013.01); *B60R 16/023* (2013.01); *B60W 40/08* (2013.01); *G06V 20/593* (2022.01); *G08B 21/02* (2013.01); *B60N 2210/22* (2023.08); *B60N 2210/30* (2023.08); *B60N 2210/50* (2023.08); *B60W 2040/0881* (2013.01); *B60W 2420/403* (2013.01); *B60W 2420/408* (2024.01)

(58) Field of Classification Search
CPC .............. B60N 2210/50; B60W 40/08; B60W 2040/0881; B60W 2420/403; B60W 2420/408; G06V 20/593; G08B 21/02
USPC ...................................................... 340/425.5
See application file for complete search history.

(56) References Cited

U.S. PATENT DOCUMENTS

| | | | |
|---|---|---|---|
| 6,930,614 | B2 | 8/2005 | Rackham et al. |
| 7,012,533 | B2* | 3/2006 | Younse ................. B60N 2/267 701/45 |
| 7,714,737 | B1* | 5/2010 | Morningstar ........ B60N 2/2812 340/552 |
| 8,970,362 | B2 | 3/2015 | Morley et al. |
| 10,071,654 | B2 | 9/2018 | Mclean, Jr. et al. |
| 10,242,552 | B1 | 3/2019 | Davis |
| 2002/0161501 | A1* | 10/2002 | Dulin ................. B60H 1/00735 701/45 |
| 2012/0232749 | A1* | 9/2012 | Schoenberg ......... B60N 2/0033 340/457 |
| 2013/0194089 | A1* | 8/2013 | Estrada ................ B60N 2/2816 340/584 |
| 2016/0307432 | A1* | 10/2016 | Downs ................... B60N 2/268 |
| 2017/0263098 | A1 | 9/2017 | Garcia |
| 2018/0065504 | A1 | 3/2018 | Lan et al. |
| 2018/0251122 | A1 | 9/2018 | Golston et al. |
| 2019/0143944 | A1 | 5/2019 | Park |
| 2019/0215672 | A1 | 7/2019 | Orris et al. |
| 2020/0094709 | A1* | 3/2020 | Dutkin .................... B60R 99/00 |
| 2020/0320841 | A1 | 10/2020 | Sim |
| 2020/0398637 | A1 | 12/2020 | Chang et al. |
| 2021/0114485 | A1 | 4/2021 | Ito |

* cited by examiner

VEHICLE OCCUPANCY MONITOR

CROSS-REFERENCE TO RELATED APPLICATIONS

This application is a continuation of U.S. application Ser. No. 17/550,103, filed Dec. 14, 2021, which is a continuation of U.S. application Ser. No. 16/900,258, filed Jun. 12, 2020, now U.S. Pat. No. 11,230,246, issued Jan. 25, 2022, which claims the benefit of U.S. Application Ser. No. 62/866,277, filed Jun. 25, 2019. The complete disclosures of all of the above patent applications are hereby incorporated by reference in their entirety for all purposes.

TECHNICAL FIELD

This disclosure application relates generally to monitoring systems.

BACKGROUND

A driver can forget that there is a child in a vehicle. For example, a driver can forget to drop of a child at daycare on the way to work, or may forget that there is a child inside the vehicle while unloading the vehicle. When left in a vehicle, children may become seriously injured, or may die, due to pediatric vehicular heatstroke. Some deaths are prevented by bystanders who alert authorities, but it can be difficult to identify a child in danger.

SUMMARY

Techniques are described for vehicle occupancy monitoring and alerts. Vehicle occupancy monitoring can include occupancy monitoring devices installed within a vehicle. Vehicle occupancy monitoring can also include occupancy monitoring devices external to a vehicle, such as devices that are installed in a garage, or devices that patrol a parking lot.

A vehicle occupancy monitoring device installed within a vehicle can be a car seat monitor that uses a combination of sensors to identify when a child has been left in a vehicle. The car seat monitor can determine the presence of a child in a vehicle using, for example, pressure sensors, motion sensors, and microphones. The car seat monitor can evaluate if the child is in a dangerous situation based on information about the vehicle such as the vehicle's temperature, location, speed, and additional occupancy. The car seat monitor can take actions to alert users, bystanders, and authorities to a dangerous situation. The car seat monitor can also trigger automatic actions to draw attention to the vehicle, and to make the conditions inside the vehicle safe for the child.

A vehicle occupancy monitoring device external to a vehicle can be a scanner that uses a combination of sensors to determine the occupancy of a vehicle. The scanner can use a combination of visual cameras, thermal cameras, LIDAR, and SONAR to obtain images of the interior of the vehicle. The scanner can analyze the images to determine the presence of a child inside the vehicle. The scanner can take actions to alert users, bystanders, and authorities to a dangerous situation.

Implementations of the present disclosure will be discussed in further detail with reference to an example context, however, the implementations discussed may be applicable more generally to vehicle occupancy monitoring. The example context includes a child within a vehicle, however, implementations can be realized in other appropriate other contexts. For example, implementations can be realized in the context of any person or animal that is unable to exit from a vehicle without assistance.

According to an innovative aspect of the subject matter described in this application, a vehicle monitoring system for monitoring a vehicle includes one or more processors and one or more computer storage media storing instructions that are operable, when executed by the one or more processors, to cause the one or more processors to perform operations. The operations include: receiving, from a vehicle occupancy monitor and by the vehicle monitoring system, vehicle occupancy data that indicates presence of a vehicle occupant; receiving, by the vehicle monitoring system and from a sensor, sensor data that indicates an attribute of the vehicle; analyzing, by the vehicle monitoring system, the vehicle occupancy data and the sensor data; and based on analyzing the vehicle occupancy data and the sensor data, performing a vehicle monitoring system action.

Implementations of the described techniques may include hardware, a method or process implemented at least partially in hardware, or a computer-readable storage medium encoded with executable instructions that, when executed by a processor, perform operations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
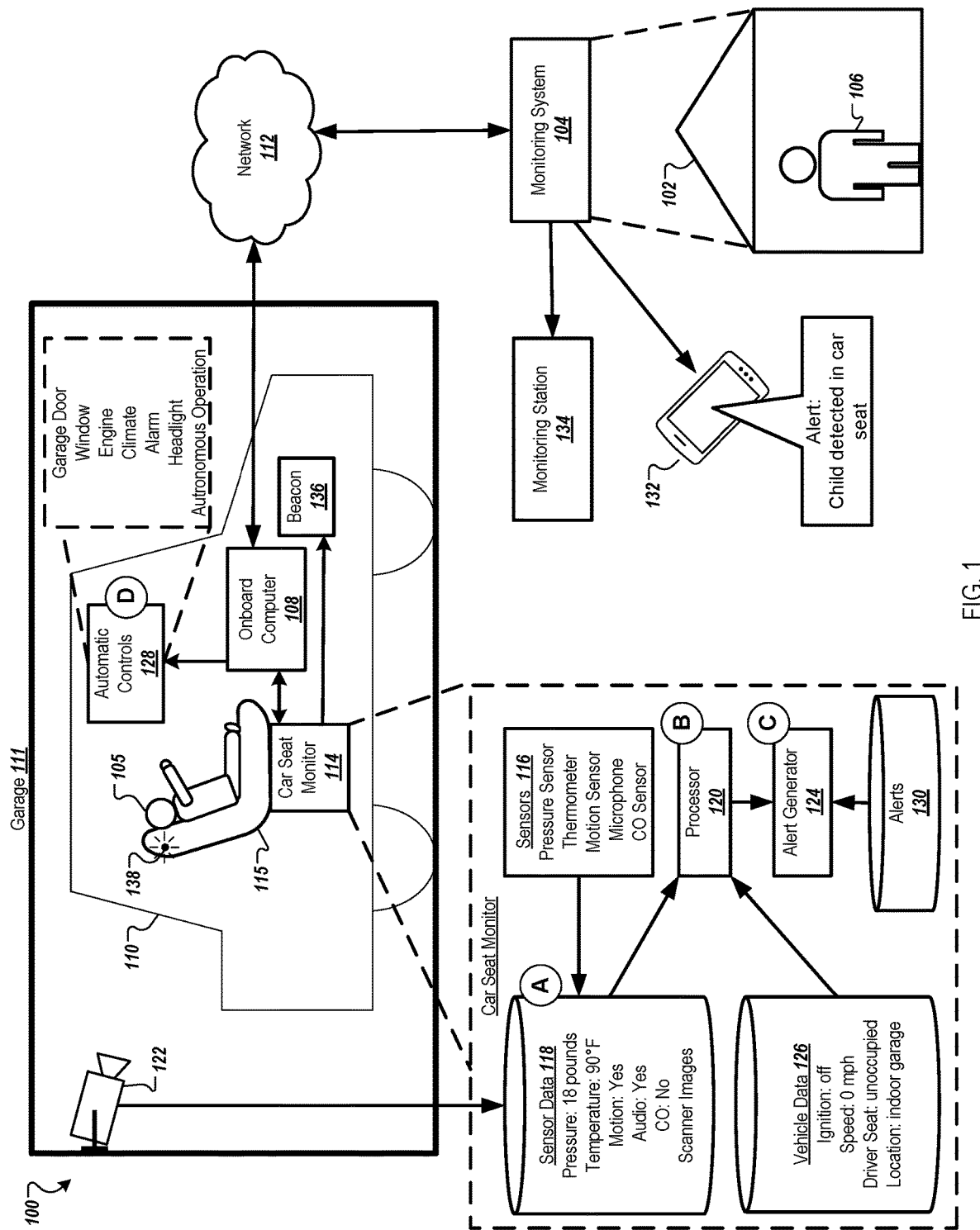
FIG. 1 illustrates an example operating environment for vehicle occupancy monitoring at a property.

FIG. 1 illustrates an example operating environment 100 for vehicle occupancy monitoring at a property.

In FIG. 1, a property 102 and a vehicle 110 are monitored by a monitoring system 104. The property 102 can be a home, another residence, a place of business, a public space, or another facility that is monitored by a monitoring system. The user 106 of the monitoring system can be, for example, a resident, landlord, or tenant of the property 102.

The monitoring system 104 of the property 102 connects to an onboard computer 108 of the vehicle 110 over a network 112. The network 112 can be any appropriate long-range data link. The network 112 can include any combination of wired and wireless data networks. For example, the network 112 can be a wide-area-network (WAN), a broadband internet connection, a cellular telephony network, a wireless data network, a cable connection, a digital subscriber line (DSL), a satellite connection, or other electronic means for data transmission.

In FIG. 1, the user 106 has parked the vehicle 110 in the garage 111 of the property 102. The user 106 has exited the vehicle and entered the property 102. There is a child 105 sitting in a car seat 115 inside the vehicle 110.

The vehicle 110 includes a car seat monitor 114. The car seat monitor 114 can be a built-in component of the car seat 115, or can be a separate physical device connected to the car seat 115. The car seat monitor 114 includes one or more sensors 116, a processor 120, and an alert generator 124. The sensors 116 can include, for example, pressure sensors, thermometers, motion sensors, microphones, and carbon monoxide sensors. A pressure sensor can determine if the child 105 is in the car seat 115 based on the weight of the child 105. A motion sensor can be used to distinguish between the child 105 and a stationary object that may be placed in the car seat 115. A microphone can detect sounds made by the child 105. A thermometer can measure the temperature of the vehicle 110 over time to determine life-threatening conditions, since long periods of modest heat can be as dangerous as extremely high temperatures. A carbon monoxide sensor can measure and track the carbon monoxide levels within the vehicle to determine life-threatening conditions, e.g., if the child 105 was left inside the vehicle 110 in the garage 111 with the engine on.

In some examples, the sensors 116 can be part of the same physical device as the car seat monitor 114. In some examples, the sensors 116 can be part of a different physical device from the car seat monitor 114. For example, a motion sensor can be an accelerometer built in to the car seat 115. A motion sensor can also be a passive infrared (PIR) sensor mounted to a component within the vehicle 110, e.g., the roof, and can communicate with the car seat monitor 114 via a wired or wireless connection.

In some examples, a scanner 122 can be mounted external to the vehicle 110, e.g., in a garage where the vehicle 110 routinely parks. The scanner 122 obtains images of the vehicle 110 for the purpose of determining the occupancy of the vehicle 110. The scanner 122 can incorporate multiple types of sensors. For example, the scanner 122 can include one or more of the following: a visual camera, a thermal camera, a light detection and ranging (LIDAR) detector, and an in-air sound navigation and ranging (SONAR) detector. The combination of sensors within the scanner 122 improves the ability of the scanner 122 to determine the occupancy of the vehicle 110, and specifically, to identify the presence of the child 105. For example, if the environment is dark, or if the windows of the vehicle 110 are tinted, a visual camera alone may not be able to discern the image of the child 105 inside the vehicle. Likewise, if the environment is hot, a thermal camera alone may not be able to discern the child 105's body temperature from the background temperature. Using data from a combination of sensors, the scanner 122 can identify the presence of the child 105 in various environmental conditions.

In stage (A) of FIG. 1, the sensors 116 collect sensor data 118. The sensor data 118 includes, from the pressure sensors, the pressure on the car seat 115 indicating a weight of 18 pounds. The sensor data 118 includes, from the thermometer, a temperature of 90 degrees Fahrenheit (° F.) inside the vehicle 110. The sensor data 118 includes, from the motion sensor and microphone, positive detections of motion and audio within the vehicle 110. The sensor data 118 includes a negative detection of carbon monoxide within the vehicle 110. The sensor data 118 also includes images from the scanner 122, such as visual, thermal, LIDAR, and SONAR images. The images from the scanner 122 may show the form of a child 105 in the car seat 115.

The car seat monitor 114 receives, from the onboard computer 108 of the vehicle 110, vehicle data 126. The vehicle data 126 can include, for example, the vehicle 110's ignition status, indicating that the vehicle 110's ignition is off. The vehicle data 126 can also include the vehicle 110's speed, indicating that the vehicle is stationary. The vehicle data 126 can include a determination of whether or not the driver's seat is occupied based on pressure sensors installed in the driver's seat. The vehicle data 126 can also include the vehicle's location. For example, the vehicle 110's location can come from a global positioning system (GPS) receiver. In some examples, the vehicle 110's location can be determined by the monitoring system 104 of the property 102. For example, the monitoring system 104 may include a geofence for determining when the vehicle 110 enters and exits the garage 111. Based on crossing the geofence, the onboard computer 108 can provide vehicle data 126 to the car seat monitor 114 indicating that the vehicle 110 is inside the garage 111.

In stage (B) of FIG. 1, the processor 120 receives the sensor data 118 and the vehicle data 126. The processor 120 analyzes the sensor data 118 to determine if a child is inside the vehicle 110. For example, the processor 120 can analyze the images from the scanner 122, e.g., using video analytics. The processor 120 can determine if there is a form or shape of a child within the images. The processor 120 also analyzes the data from the motion sensor to determine if there is a moving object inside the vehicle 110. The processor analyzes the audio data from the microphone using audio analytics, e.g., to detect cries of distress. The processor analyzes the pressure data from the pressure sensor to determine if a weighted object is in the car seat 115. The processor 120 determines, based on a combination of the sensor data 118 from the motion sensor, microphone, pressure sensor, and scanner images, if there is a child inside the vehicle 110.

The combination of data from multiple sources improves the processor 120's accuracy in identifying the presence of the child 105. For example, if the child 105 is asleep, and therefore not moving or making audible sounds, the microphone and motion sensor will not trigger detection of the child 105. The processor 120 can still determine the presence of the child 105 based on analyzing a combination data from the pressure sensor and scanner images. Likewise, if the child 105 is inside the vehicle 110, but not in the car seat 115, pressure sensors and motion sensors that are built in to the car seat 115 will not trigger detection of the child 105. The processor 120 can still determine the presence of the child 105 based on analyzing data from a PIR motion sensor, a microphone, and scanner images.

The processor can use a rules-based system to determine that the child 105 is inside the vehicle 110. The rules can be default rules, set in advance by a system administrator. The rules can also be custom rules, set or modified by the user 106 of the monitoring system 104. The rules may be general, such that they are applied to more than one car seat monitor 114, or they may be specific to the particular vehicle 110. In some implementations, the user 106 can customize the rules according to his or her preferences. In some implementations, the user 106 can set the one or more rules through a software application executing on a mobile phone 132, through a graphical interface provided by a browser or application on a computing device, and/or through interacting with a physical interface of a control unit of the monitoring system 104.

An example rule may state that if any single sensor 116 indicates the presence of the child 105, the processor 120 determines that the child 105 is inside the vehicle 110. The processor 120 can then determine that the child 105 is inside the vehicle 110 based on any single indication, e.g., the pressure sensor detecting a weighted object in the car seat 115, or the motion sensor detecting motion within the vehicle 110. In some examples, a rule may state that a combination of sensor data 118 from at least two sensors 116 is required to determine that the child 105 is inside the vehicle 110. The processor 120 can then determine that the child 105 is inside the vehicle 110 based on, e.g., a combination of video analytics of the images from the scanner 122 and audio analytics from the audio data from the microphone. In some examples, the processor 120 may calculate a probability that the child 105 is inside the vehicle 110, based on a combination of sensor data 118. The rules can include a threshold probability, e.g., 50 percent. If the probability that the child 105 is inside the vehicle 110 exceeds the threshold probability, the processor 120 can determine that the child 105 is inside the vehicle 110.

In some examples, the processor 120 can used a machine learning approach to determine if the child 105 is inside the vehicle 110. The processor 120 can include one or more neural networks, linear or logistic regression models, decision trees, support vector machines, Bayesian techniques, nearest-neighbor or clustering techniques, or other machine learning approaches. The machine learning approach of the processor 120 may include supervised and/or unsupervised learning.

The processor 120 may support machine learning using labeled training data. The labeled training data can be, for instance, sensor data 118 that has been labeled by the user 106, by a manufacturer or installer, or by a computer-implemented algorithm. The training data may be labeled to indicate that certain sensor data 118 corresponds to the child 105 in the car seat 115 inside the vehicle 110. Additionally, training data can be provided that corresponds to the absence of the child 105 from the vehicle 110.

Through machine learning, the processor 120 can learn the typical sensor data 118 collected when the child 105 is inside the vehicle 110. For example, the processor 120 can learn the child's typical weight detected by the pressure sensor, the audio frequencies of the child's voice detected by the microphone, the amount of motion typically detected by the motion sensor, and the characteristics of the images from the scanner 122 that include the child 105 inside the vehicle 110. Likewise, the processor 120 can learn the typical sensor data 118 that is collected when the child 105 is not inside the vehicle 110. The processor 120 can then determine when the child 105 is inside the vehicle 110 based on the alignment of the sensor data 118 with the typical sensor data 118 values.

Once the processor 120 determines that the child 105 is inside the vehicle 110, the processor 120 analyzes the sensor data 118 and the vehicle data 126 to determine if the child 105 is in a dangerous situation within the vehicle 110. The processor 120 can determine if the child 105 is in a dangerous situation based on sensor data 118, e.g., from the thermometer and carbon monoxide detector, and based on vehicle data 126, e.g., indicating the location, speed, and presence a driver. For example, the vehicle data 126 may indicate that the vehicle 110 is inside the garage 111 with the ignition off, and the driver's seat is unoccupied. The sensor data 118 may indicate that the interior temperature is 90° F., and that no carbon monoxide is detected.

The processor can used a rules-based system to determine that the child 105 is in a dangerous situation due to being left alone inside the vehicle 110 in the hot garage 111. For example, a rule may state that a dangerous situation exists for the child 105 after 20 minutes alone in a cool garage, and after 10 minutes alone minutes in a hot garage. Another rule may state that a dangerous situation exists after 10 minutes alone in a public location at low temperatures, and after 5 minutes alone in a public location at higher temperatures. In some examples, the rules can be customized according to the particular geographical location, season of the year, age of the child, or other factors.

In some implementations, the processor 120 can use a machine learning approach to determine if the child 105 is in a dangerous situation. The processor 120 may support machine learning using labeled training data, for instance, sensor data 118 and vehicle data 126 that has been labeled by the user 106, by a manufacturer or installer, or by a computer-implemented algorithm. The training data may be labeled to indicate that certain sensor data 118 and vehicle data 126 corresponds to dangerous conditions inside the vehicle 110. Additionally, training data can be provided that corresponds to safe conditions inside the vehicle 110.

Through machine learning, the processor 120 can learn the typical sensor data 118 and vehicle data 126 that indicate dangerous and safe conditions inside the vehicle. The processor 120 can then determine when the child 105 is in a dangerous or safe situation inside the vehicle 110. For example, the vehicle data 126 may indicate that the vehicle 110 is traveling at 30 miles per hour, and the driver's seat is occupied, while the sensor data 118 indicates that the temperature is 70° F. The processor 120 can determine that the child 105 is in a safe situation, due to being accompanied inside the vehicle 110 at a cool temperature.

In some examples, the car seat monitor 114 can receive monitoring system data, including property occupancy data, from the monitoring system 104. For example, the monitoring system 104 may include sensors located at the property that can determine if the child 105 and/or the user 106 is inside the property 102. Example sensors of the monitoring system 104 can include cameras, microphones, motion sensors, and crib occupancy sensors.

The property occupancy data can include a property occupancy status of "occupied" or "unoccupied." The property occupancy data can also include a number of occupants of the property. In some examples, the property occupancy data can include a status of individual residents of the property. For example, the property occupancy data can indicate that a first resident is inside the property 102, and that a second resident is not inside the property 102. The occupancy of the property can be determined using, for example, voice recognition, facial recognition, and/or geofencing.

Based on sensor data from one or more sensors, the monitoring system 104 may determine that the child 105 is inside the property 102. The car seat monitor 114 can receive the monitoring system data from the monitoring system 104 indicating that the child 105 is inside the property 102. The car seat monitor 114 can then determine a lower probability that the child 105 is inside the vehicle 110.

In another example, upon determining that the child 105 is inside the vehicle 110, the car seat monitor 114 may receive monitoring system data from the monitoring system 104 indicating that the user 106 is inside the property 102. The car seat monitor 114 can then determine a higher probability that the child 105 is unattended. The monitoring system 104 may provide the car seat monitor 114 with data indicating the time that the user 106 entered the property 102. Based on the time that the user 106 entered the property 102, the car seat monitor 114 can determine the amount of time that the child 105 has been unattended.

In stage (C) of FIG. 1, the processor 120 sends a signal to the alert generator 124 indicating that the child 105 is in a dangerous situation within the vehicle 110. The alert generator 124 then generates one or more alerts 130. The alerts 130 can include information about the vehicle 110 and the detected child 105. For example, the alerts 130 can include information regarding the location of the vehicle 110, the time that the child 105 has been inside the vehicle 110, and the temperature of the vehicle 110.

An alert 130 can, for example, be a text message or SMS to the mobile phone 132, a pop-up message to an application on the mobile phone 132, or an automatic phone call to the property 102. The alert 130 can also include flashing lights, alarm sounds, and/or vibration alarms from the mobile phone 132. The alert generator 124 can send the alert 130 using, e.g., an LTE or Category-M connection. The alert 130 can include a request for acknowledgement. For example, the user receiving the alert 130 may need to press a certain button or speak a certain phrase in order to silence the alert 130.

The car seat monitor 114 can send the alert 130 to one or more other users who are not the user 106. A user 106 who receives an alert 130 may be another resident of the property 102, a neighbor of the property 102, or emergency services (e.g., police). The car seat monitor 114 can also send the alert 130 to the onboard computer 108 of the vehicle 110, and/or to the monitoring system 104 of the property 102. In some examples, the alert can include activating an audible or visual alarm from the monitoring system 104.

In some implementations, the car seat monitor 114 provides the alert 130 to one or more users in an escalating hierarchy. For example, the car seat monitor 114 can send the first alert 130 to the user who is nearest to the vehicle 110 and/or to the user who was last inside the vehicle 110. The car seat monitor 114 can determine the user who is nearest to the vehicle 110, and the user who was last inside the vehicle 110, in a number of ways. For example, the car seat monitor 114 can determine the locations of different users based on the locations of users' cell phones, as determined using GPS or geofencing. In some examples, the car seat monitor 114 can determine the locations of different users based on data gathered by the monitoring system 104. For example, the monitoring system 104 can include motion sensors and/or surveillance cameras in the property 102 that identify locations of users within the property 102.

In some examples, the car seat monitor 114 can determine the most recent driver of the vehicle 110 by analyzing and recognizing driver behavior patterns that are characteristic of individual users. The car seat monitor 114 may also determine the user who was last inside or near the vehicle 110 by analyzing recent images from the scanner 122 using facial recognition techniques.

If the user who is nearest to the vehicle 110 and/or the user who was last inside the vehicle 110 does not acknowledge the alert 130 within a certain period of time, the car seat monitor 114 can send the alert 130 to other users of the monitoring system 104. If no users acknowledge the alert 130, the car seat monitor 114 can send the alert 130 to emergency contacts listed for the property 102, e.g., neighbors or family members. If the car seat monitor 114 still does not receive an acknowledgement, the car seat monitor 114 can send the alert 130 to the monitoring station 134 of the monitoring system 104. The monitoring station 134 can obtain the vehicle 110's location through the vehicle 110's navigation system, and/or from the GPS receiver on the user 106's phone at the time when the user 106 exited the vehicle 110. The monitoring station 134 can contact emergency services such as police, and provide emergency services with the vehicle 110's location.

In some examples, the user receiving the alert 130 may acknowledge the alert 130 without taking any action to recover the child 105. For example, the user receiving the alert 130 may forget to take action after acknowledging the alert 130. The processor 120 continues to monitor the sensor data 118 and the vehicle data 126 after the alert 130 is acknowledged. After a certain period of time, if the child 105 is still inside the vehicle 110, the processor 120 sends a signal to the alert generator 124 to re-send the alert 130, and/or to escalate the alert 130 to the next level of the notification hierarchy.

In some examples, the car seat monitor 114 can activate a beacon 136. The beacon 136 can broadcast a distress signal to other devices, such as smart watches or smart phones, within an area. For example, the beacon 136 can broadcast the distress signal to all devices within an area that are registered to the same monitoring service. In some examples, the beacon 136 can broadcast the distress signal to devices that belong to nearby security personnel, such as commercial property security, residential property security, or parking lot security. In some examples, the beacon 136 can broadcast the distress signal within a designated radius through programs such as the Wireless Emergency Alert program, similar to an Amber Alert or a Silver Alert.

In some examples, the car seat monitor 114 can activate a flashing light 138, such as an LED light. The flashing light 138 can be attached to the car seat 115, or can be attached externally to the vehicle 110. The flashing light 138 can help bystanders and emergency responders quickly identify the vehicle 110 when responding to the alert 130.

In some examples, the car seat monitor 114 can delay sending the alert 130 upon detecting the child 105 inside the vehicle 110. For example, when the user 106 arrives at home, the user 106 may need to put down a bag of groceries or other items in the property 102, and then return promptly to remove the child 105 from the car seat 115. The car seat monitor 114 can allow a small segment of time to elapse before taking any action such as sending the alert 130 to the user 106. By delaying the alert 130, the car seat monitor 114 can reduce the number of false positive alerts. Reducing the number of false positive alerts is beneficial because it reduces the likelihood of alert fatigue with the user 106. For example, if the user 106 receives alerts too frequently, the user 106 may begin to ignore the alerts, causing a true alert to be ignored.

In some examples, the car seat monitor 114 can determine to send the alert 130 based on monitoring system data from the monitoring system 104. For example, monitoring system data may include the location of the user 106 within the property 102, and the status of the monitoring system 104. The status of the monitoring system 104 can be, for example, "armed, away," "armed, stay," or "unarmed."

The monitoring system data may indicate the user's activities within the property 102 and the user's intention to return to the vehicle 110. For example, the user 106 may exit the garage 111 and enter the property 102, leaving the child 105 inside the vehicle 110. If the user 106 does not intend to return to the vehicle 110, the user 106 may set the monitoring system status to "armed, stay." The user 106 may also take actions such as turning on one or more appliances, e.g., a television or laundry washing machine, and/or starting a water flow, e.g., for a shower or laundry cycle. The monitoring system 104 may determine the user's actions based on data from various sensors, e.g., appliance monitoring devices and/or water flow sensors.

The monitoring system 104 can send data indicating the user's actions within the property 102 to the car seat monitor 114. The car seat monitor 114 can determine that the user 106 is not likely intending to return to the vehicle 110. The car seat monitor 114 can then send the alert 130 to the user 106 based on the location and/or activities of the user 106 within the property 102. For example, if the monitoring system 104 determines that the user 106 has started running a shower in the master bathroom, the car seat monitor 114 can send the alert 130 to the mobile phone 132, to a smart speaker in the master bathroom, to the monitoring system control panel, or all of these.

When a child 105 is detected in a vehicle 110, the car seat monitor 114 can delay for a longer or shorter period of time based on the urgency of the situation. For example, if the vehicle 110 is in the garage with the ignition turned off, and thermometer indicates a steady temperature of 0° F., the car seat monitor 114 may delay sending the alert 130 for several minutes. Likewise, if the vehicle 110 is outside with the ignition on and the temperature is steady at 70° F., the car seat monitor 114 may delay sending a signal to the car seat monitor 114 for several minutes. However, if the vehicle 110 is inside the garage 111 with the ignition on, or if the vehicle 110 is outside and the temperature is rapidly climbing, the car seat monitor 114 may send the alert 130 immediately.

In stage (D) of FIG. 1, the onboard computer 108 activates one or more automatic controls 128 in response to receiving the alert 130. The automatic controls 128 can include, for example, garage door control, window control, engine control, climate control, security alarm control, headlight control, and autonomous operation. If the vehicle 110 is in a hot, closed garage, the onboard computer 108 can activate automatic controls 128 in order to open the garage 111 door, start the engine, and adjust climate control to a cool temperature. The onboard computer 108 can also activate the security alarm and/or flash the headlights to draw attention to the vehicle 110. If the vehicle 110 has autonomous capabilities, the onboard computer 108 can drive the vehicle 110 to a safer location. For example, the onboard computer 108 can drive the vehicle 110 from a sunny location to a shady location. In another example, the onboard computer 108 can drive the vehicle 110 from an unpopulated location to a populated location, so that bystanders can assist with recovery and care of the child 105.

In some examples, the car seat monitor 114 can learn, e.g., through machine learning, the typical routine of the user 106, and can alert the user 106 to deviations from the routine. For example, the user 106 may typically return home from work in the afternoon, park the vehicle 110 in the garage 111, open a backseat door, and then lift the child 105 out of the car seat 115. These actions are recorded by the scanner 122 and analyzed by the processor 120. On a certain occurrence, the scanner 122 records the user 106 parking the vehicle 110 in the garage 111 and directly entering the property 102. The processor 120 can detect the deviation from the routine, and the alert generator 124 can generate an alert 130 for the user 106. The alert 130 can notify the user 106 that the car seat monitor 114 has detected a deviation from the routine. The car seat monitor 114 can request an acknowledgement from the user 106 that the child 105 is not inside the vehicle 110.

In some cases, a user 106 with a garage 111 or a parking spot at a safe temperature may choose to leave a sleeping child 105 inside the vehicle 110 with the windows down and check on the child 105 periodically. The car seat monitor 114 can include an option to assist the user 106 using a combination of sensors at the property 102. The car seat monitor 114 can include a reminder feature can be set to remind the user 106 to check on the child periodically, e.g., every 5 minutes. Additionally, carbon monoxide detectors and thermometers can be activated at a stricter threshold compared to normal settings. The microphones and motion sensors can be set to notify the user 106 at the detection of any sound or motion within the vehicle, to alert the user 106 to the child 105 waking.

In some examples, the car seat monitor 114 can include a removable car seat 115 that attaches to a permanent base unit. The permanent base unit includes a microprocessor with a short-range wireless receiver. The microprocessor can be powered using dedicated batteries, or connected to the vehicle 110's power system. A no-power transmitter (for example a near-field communications (NFC) sticker/tag or key fob) can be attached to the removable car seat 115. When the car seat 115 is placed in the permanent base, a connection between the base receiver and the car seat 115 transmitter is established, and the microprocessor identifies the child 105 as inside the vehicle 110. When the user 106 removes the car seat 115 from the base, the connection is broken. The microprocessor then identifies the child 105 as out of the vehicle 110.

The microprocessor attached to the car seat 115 can also include a Bluetooth receiver that monitors for connections from the mobile phone 132 of the user 106. If the Bluetooth connection is lost, and the car seat 115 is still attached to the base, the car seat monitor 114 can send out an alert 130 indicating that the child 105 is still inside the vehicle 110.

In some examples, the mobile phone 132 can use a Bluetooth connection to the vehicle 110 as a triggering mechanism. When the mobile phone 132 loses its connection to the vehicle 110, the mobile phone 132 sends a query to the microprocessor to determine if the child 105 is still inside the vehicle 110. If the child 105 is still inside the vehicle 110, the car seat monitor 114 sends an alert 130 to the mobile phone 132.

In some examples, the mobile phone 132 can use a Bluetooth connection to components of the monitoring system 104 as a triggering mechanism. When the user 106 enters the property 102, the mobile phone 132 may automatically connect with one or more Bluetooth devices that are components of the monitoring system 104. If the mobile phone 132 connects only with a Bluetooth device that is located in close proximity to the entry to the property 102, the monitoring system 104 may take no action. If the mobile phone 132 connects with a Bluetooth device that is further away from the entry the property 102, e.g., a Bluetooth device that is on a different level of the property 102, the monitoring system 104 can determine that the user 106 has moved away from the entry of the property 102, and may not intend to return to the vehicle 110. Based on the determination that the user 106 has moved away from the entry of the property 102, the monitoring system 104 can send a query to the microprocessor of the car seat monitor 114 to determine if the child 105 is still inside the vehicle 110. If the child 105 is still inside the vehicle 110, the car seat monitor 114 can send an alert to the mobile phone 132 and/or the control panel of the monitoring system 104.

Figure 2:
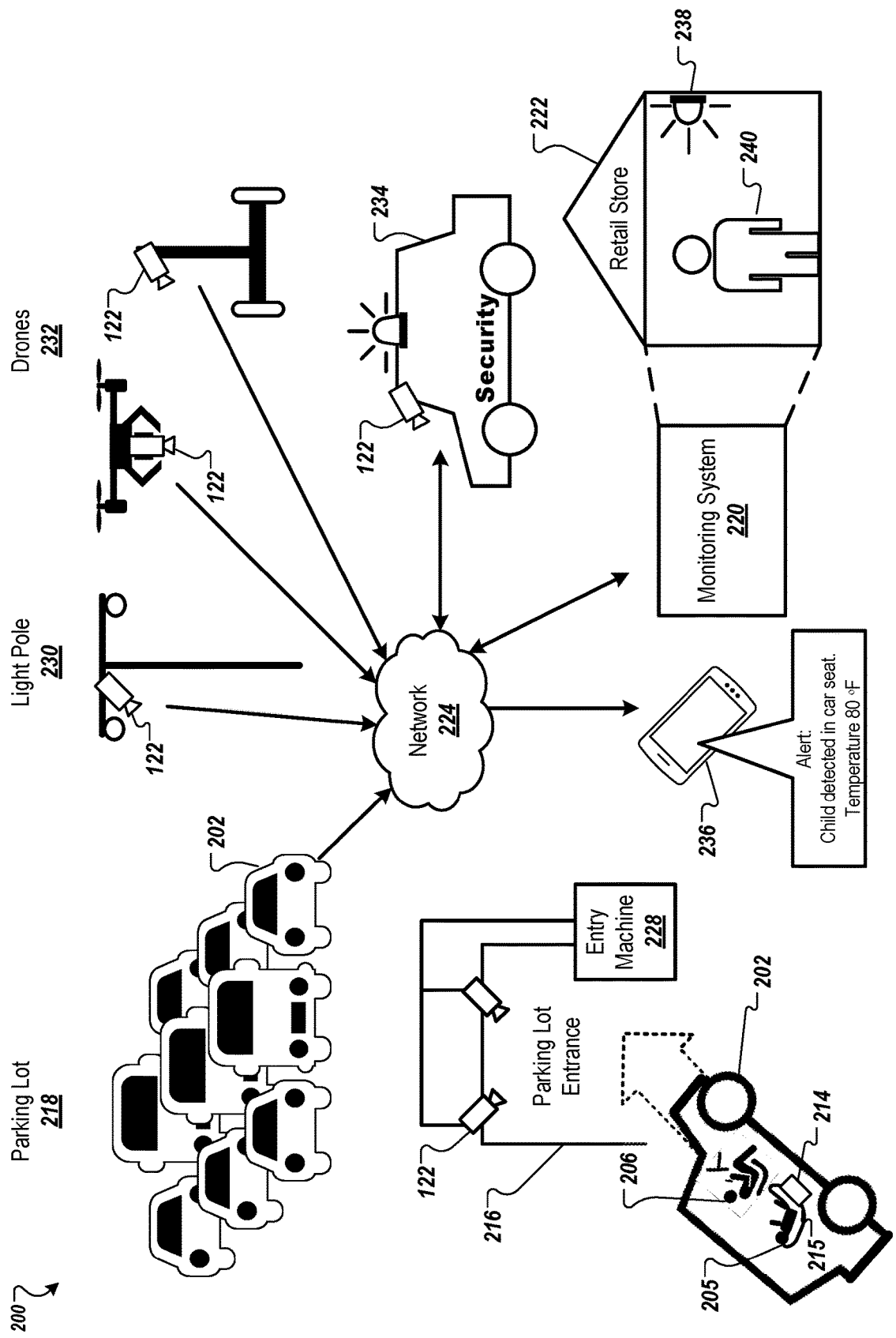
FIG. 2 illustrates an example operating environment for vehicle occupancy monitoring in a public space.

FIG. 2 illustrates an example operating environment 100 for vehicle occupancy monitoring in a public space.

In FIG. 2, a vehicle 202 includes a car seat monitor 214. A driver 206 drives the vehicle 202 while a child 205 sits in a car seat 215. The driver 206 drives the vehicle 110 through the entrance 216 to a parking lot 218. The parking lot 218 can be any parking area, such as an outdoor parking lot or an indoor parking garage.

One or more scanners 122 are installed at the entrance 216 to the parking lot 218. For example, the scanners 122 can be integrated into lighting overhead systems at the entrance 216, or can be attached to an entry machine 228. As the vehicle 202 enters the parking lot 218, the scanners 122 record images of the vehicle 202 in order to determine the number of passengers inside the vehicle 202. The scanners 122 are located in appropriate positions for obtaining images of the interior of the vehicle 202 at optimal angles. In some examples, the scanners 122 are in fixed positions and can rotate in place to adjust the direction of the field of view. In some examples, the scanners 122 are in adjustable positions to allow the scanners 122 to obtain images of various sizes of vehicles.

When entering the parking lot 218, the driver 206 pauses at the entry machine 228. If the driver 206 regularly parks in the parking lot 218, e.g., for work, the driver 206 may pause at the entry machine 228 to scan a pass or key fob that allows the driver 206 to enter the parking lot 218. If the parking lot 218 is a public parking lot 218, the driver 206 may pause at the entry machine 228 to obtain an entry ticket. While the vehicle 202 is paused at the entry machine 228, the scanners 122 can scan the vehicle 202 to obtain images of the interior of the vehicle 202.

The scanners 122 can include a processor that analyzes the images using video analytics. The scanners 122 determine the number of passengers inside the vehicle 202 and the passengers' locations within the vehicle 202. For example, the scanners 122 can determine that the vehicle 202 has two passengers. The first passenger is the driver 206 in the driver's seat, and the second passenger is the child 205 in the backseat.

The scanners 122 connect to the entry machine 228 via a wired or wireless connection. The scanners 122 send a signal to the entry machine 228 indicating the number of passengers inside the vehicle 202. The control panel on the entry machine 228 displays a notification to the driver 206 that multiple passengers are detected. The driver 206 then needs to acknowledge the notification, e.g., by pressing an "accept" button on the entry machine 228, before gaining access to the parking lot 218.

If the driver 206 is aware of the child 205 in the car seat 215, the driver 206 presses the "accept" button to acknowledge that the driver 206 knows there is an additional passenger. If the driver 206 is not aware of the child 205 in the car seat 215, the notification serves as a reminder to check the car seat 215 and realize that the child 205 is still inside the vehicle 202. For example, the driver 206 may have forgotten to drop off the child 205 at day care or school before driving to work.

When the vehicle 202 enters the parking lot 218, the car seat monitor 214 connects to a commercial monitoring system 220 of a nearby retail store 222 over a network 224. The driver 206 parks the vehicle 202 in the parking lot 218. The driver 206 accidentally leaves the child 205 in the car seat 215, and enters the retail store 222.

The car seat monitor 214 determines that the child 205 is alone inside the vehicle 202, and that the temperature is rising to potentially unsafe levels. Using a pre-programmed escalating hierarchy, the car seat monitor 214 sends an alert to the mobile device 236 of the driver 206. If the driver 206 does not acknowledge the alert within a specified period of time, and/or does not take action to remove the child 205 within a specified period of time, the car seat monitor 214 can send the alert to the monitoring system 220 of the retail store 222. In order to draw attention to the vehicle 202 in the parking lot 218, the car seat monitor 214 can activate a flashing LED light connected to the car seat 215. The car seat monitor 214 can also trigger one or more automatic controls to draw attention to the vehicle 202, such as activating the security alarm and/or flashing the headlights.

When the monitoring system 220 receives the alert from the car seat monitor 214, the monitoring system 220 can send a notification to security personnel 234. The monitoring system 220 can also activate an alarm 238 within the retail store 222. The alarm 238 may be, for example, an audible or visual alarm. In some examples, the alarm 238 may be installed such that the alarm 238 is observable only by employees of the retail store 222. In some examples, the alarm 238 may be installed such that the alarm 238 is observable by both employees and customers of the retail store 222. A bystander 240, e.g., an employee or customer, observes the alarm 238 and enters the parking lot 218 to search for the vehicle 202. The flashing LED light attached to the car seat 215, the audible vehicle security alarm, and/or the flashing headlights help the bystander 240 to quickly locate the vehicle 202.

The parking lot 218 can employ additional scanners 122 to determine the occupancy of vehicles that are parked in the parking lot 218. Vehicle occupancy monitoring using external scanners 122 can be used for any vehicle, whether or not the vehicle includes a car seat or a car seat monitor. Vehicle occupancy monitoring using external scanners 122 can be used to detect any person or animal within the vehicle 202.

When scanning a parking lot, the scanners 122 can perform spatial analysis to screen out images of people who are near a vehicle, but not inside the vehicle. In addition to the spatial analysis, the scanner 122 can analyze the images to determine the pose of a person inside the vehicle 202. Specifically, the scanners 122 can be programmed to detect for people in a sitting pose.

In some examples, the scanners 122 can be mounted to permanent structures, e.g., light poles 230, throughout the parking lot 218. The scanners 122 can be mounted to the light poles 230 at interval distances such that each vehicle in the parking lot 218 is within the field of view of one or more scanners 122.

In some examples, the scanners 122 can be mobile and rove the parking lot 218 checking for people or pets left in vehicles. For example, the scanners 122 can be mounted to aerial and/or ground-based drones 232. The drones 232 can patrol the parking lot 218, using the mounted scanners 122 to identify any vehicles with unattended occupants. In some examples, the scanners 122 can be used by roving security personnel 234, e.g., the scanners 122 can be attached to security patrol vehicles.

A roving scanner 122 that detects a vehicle occupant may not have the context of elapsed time. The scanner 122 can be programmed with an algorithm for estimating the temperature of the vehicle 202 based on a combination of the ambient temperature, the time of day, and the local daily sun index. The scanner 122 can determine the ambient temperature with a built-in thermometer. The scanner 122 can determine the time of day using a clock, e.g., a GPS clock. The scanner 122 can determine the local daily sun index through an internet connection. The scanner 122 may also be able to estimate the time that the vehicle 202 has been parked by measuring the thermal heat radiating from the engine of the vehicle 202 compared to the thermal heat radiating from the rest of the vehicle. For a recently parked vehicle, the engine compartment is significantly hotter than other parts of the vehicle. After the vehicle is parked for a while, the whole vehicle will have a similar heat signature. The scanner 122 can also determine the heat level inside the vehicle 202 by analyzing the temperature spectrum measured by the thermal sensor aimed at the windows of the vehicle 202.

The scanners 122 that are mounted to the light poles 230 and the drones 232 can communicate with the monitoring system 220 through the network 224. When the scanner 122 detects the child 205 inside the vehicle 202, the scanner 122 sends the vehicle information to the monitoring system 220. The vehicle information can include the vehicle model, color, license plate number, location, and estimated temperature. The monitoring system 220 can then send a notification to security personnel 234, and/or can activate the alarm 238 at the retail store 222.

The security personnel 234 can check the vehicle 202 to see if there is a person or pet inside the vehicle 202. In some cases, a person may be safely waiting inside the vehicle 202. The security personnel 234 can verify that the person inside the vehicle 202 is safe.

Figure 3:
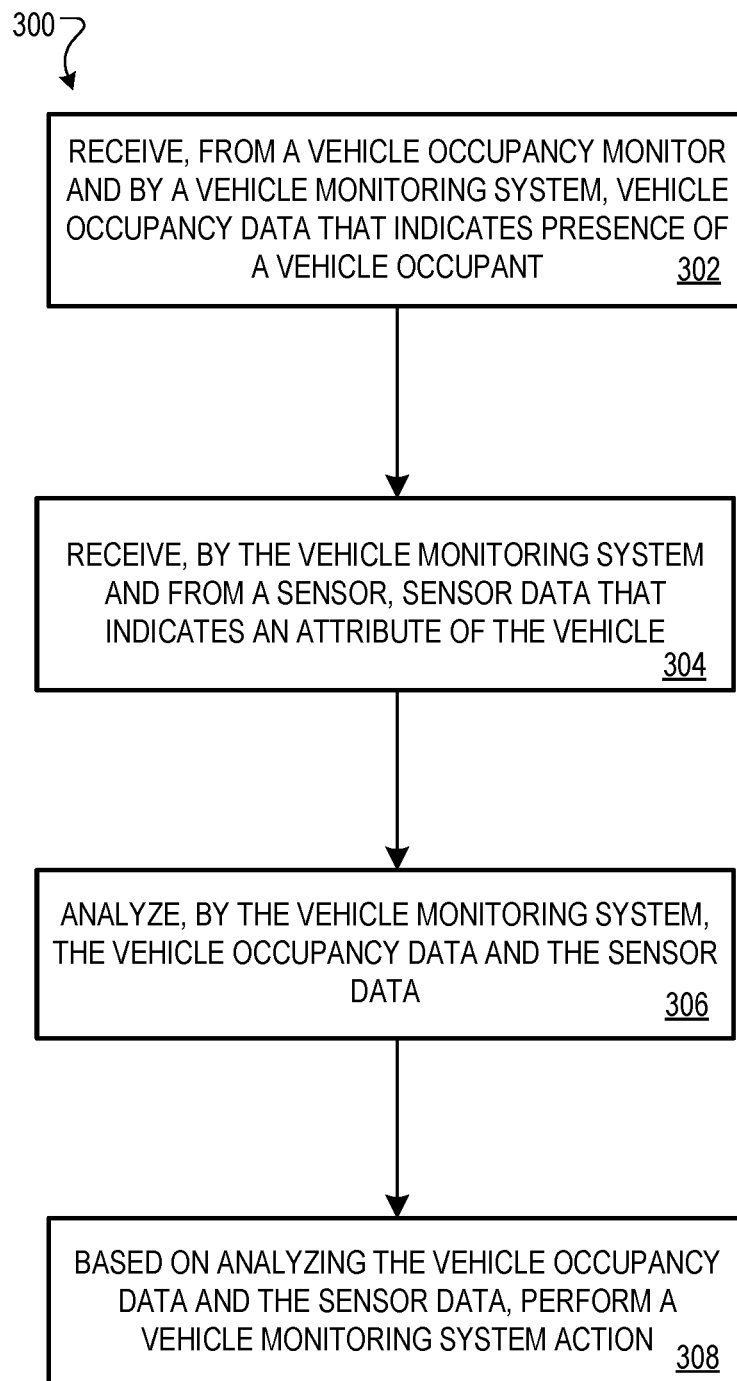
FIG. 3 is a flowchart of an example process for vehicle occupancy monitoring.

FIG. 3 is a flowchart of an example process 300 for monitoring vehicle occupancy. The process 300 can be performed by one or more computer systems, for example, the processor 120 of the car seat monitor 114, or the onboard computer 108 of the vehicle 110. In some implementations, some or all of the process 300 can be performed by a server of the monitoring system 104, or by another computer system that is located at the monitored property, is in communication with the vehicle 110, or both.

Briefly, the process 300 includes receiving vehicle occupancy data that indicates presence of a vehicle occupant (302), receiving sensor data that indicates an attribute of the vehicle (304), analyzing the vehicle occupancy data and sensor data (306), and, based on analyzing the vehicle occupancy data and the sensor data, performing a vehicle monitoring system action (308).

In more detail, the process 300 includes receiving, from a vehicle occupancy monitor and by a vehicle monitoring system, vehicle occupancy data that indicates presence of a vehicle occupant (302). The vehicle occupancy monitor can be a component of a car seat. For example the vehicle occupancy monitor can include the car seat monitor 114. The vehicle occupancy monitor can include a device external to the vehicle. For example, the vehicle occupancy monitor can include the scanner 122.

The vehicle occupancy monitor can include one or more sensors, e.g., the sensors 116, including pressure sensors, motion sensors, and microphones. The vehicle occupancy monitor can also incorporate one or more of the following sensors: a visual camera, a thermal camera, a light detection and ranging (LIDAR) detector, and an in-air sound navigation and ranging (SONAR) detector.

The vehicle occupancy data can include sensor data, e.g., the sensor data 118, including seat pressure sensor data, motion sensor data, audio data, visual image data, thermal image data, LIDAR image data, or in-air SONAR image data. The vehicle occupancy data can also include images of a vehicle for the purpose of determining the occupancy of the vehicle.

As an example, the car seat monitor 114 can receive vehicle occupancy data that indicates a weight of 30 pounds in the car seat 115, audible sounds detected inside the vehicle, and motion detected in the vehicle. The vehicle occupancy data therefore indicates the presence of a vehicle occupant, e.g., the child 105.

The process 300 includes receiving, by the vehicle monitoring system and from a sensor, sensor data that indicates an attribute of the vehicle (304). The sensor can be a sensor other than the vehicle occupancy monitor. The sensor data can include, for example, a cabin temperature, a carbon monoxide level, a vehicle door status, a vehicle window status, a vehicle ignition status, a vehicle speed, or a vehicle location.

For example, the vehicle monitoring system can receive sensor data including a cabin temperature of 80° F., a carbon monoxide concentration of zero parts per million, and an indication that all doors and windows are shut. The vehicle monitoring system can also receive sensor data indicating that the vehicle key is not in the ignition, the vehicle is stationary, and the vehicle location is a retail parking lot.

The process 300 includes analyzing, by the vehicle monitoring system, the vehicle occupancy data and the sensor data (306).

The vehicle monitoring system analyzes the vehicle occupancy data, including pressure sensor data, motion sensor data, audio data, and camera images, to determine if there is a child inside the vehicle.

The vehicle monitoring system can determine, based on analyzing the vehicle occupancy data, that the vehicle occupant is a child, e.g., the child 105. The vehicle monitoring system can determine that the vehicle occupant is a child based on, for example, a weight of the vehicle occupant. The vehicle monitoring system can be programmed with rules for identifying detected weights that correspond to children. For example, a rule may state that an occupant weight of more than five pounds and less than sixty pounds indicates that the vehicle occupant is a child. The vehicle occupancy data may include a vehicle occupant weight of forty pounds. Based on the vehicle occupant weight of forty pounds being more than five pounds and less than sixty pounds, the vehicle monitoring system can determine that the vehicle occupant is a child.

The vehicle monitoring system can determine, based on analyzing the sensor data, that a dangerous condition exists inside the vehicle. The vehicle monitoring system can analyze sensor data, including the vehicle's temperature, carbon monoxide concentration, location, speed, and presence of a driver, to determine if the occupant is in a dangerous situation within the vehicle. For example, the vehicle monitoring system can analyze vehicle sensor data indicating a carbon monoxide concentration of ten parts per million. The vehicle monitoring system may determine that the carbon monoxide concentration of ten parts per million exceeds a threshold carbon monoxide concentration of nine parts per million. Based on the carbon monoxide concentration exceeding the threshold concentration, the vehicle monitoring system can determine that a dangerous condition exists inside the vehicle.

In response to determining that the dangerous condition exists inside the vehicle, the vehicle monitoring system can determine an amount of time that the dangerous condition has existed inside the vehicle. For example, the vehicle monitoring system can determine a time that the carbon monoxide concentration surpassed the threshold concentration level. The vehicle monitoring system may determine that the carbon monoxide concentration surpassed the threshold concentration of nine part per million at time 9:05. The vehicle monitoring system may determine a current time of 9:10. Thus, the vehicle monitoring system can determine that the dangerous condition has existed inside the vehicle for five minutes.

The vehicle monitoring system can receive, from sensors located at a property, property occupancy data for the property. The sensors can include, for example, cameras, microphones, and motion sensors. The property occupancy data may indicate that an adult resident, e.g., the user 106, is inside the property 102.

The vehicle monitoring system can determine, based on analyzing the vehicle occupancy data and the property occupancy data, that a person other than the vehicle occupant has exited the vehicle and entered the property. For example, the vehicle monitoring system can determine, based on the vehicle occupancy data, that the user 106 of the vehicle 110 has exited the vehicle 110. The vehicle monitoring system can determine, based on analyzing the property occupancy data, that the driver of the vehicle has entered the property 102.

The vehicle monitoring system can determine, based on analyzing the vehicle occupancy data, that the vehicle occupant is unattended. For example, based on the driver of the vehicle exiting the vehicle and entering the property, the vehicle monitoring system can determine that the driver of the vehicle is not inside or near the vehicle. Based on the vehicle occupancy data indicating presence of the vehicle occupant, the vehicle monitoring system can determine that the vehicle occupant is unattended.

In response to determining that the vehicle occupant is unattended, the vehicle monitoring system can determine an amount of time that the vehicle occupant has been unattended. For example, the vehicle monitoring system can determine, based on data from vehicle door sensors and a driver's seat occupancy sensor, that ten minutes has elapsed since the driver exited the vehicle, and therefore that the vehicle occupant has been unattended for ten minutes.

The process 300 includes, based on analyzing the vehicle occupancy data and the sensor data, perform a vehicle monitoring system action (308). In response to determining that the vehicle occupant is a child and that the dangerous condition exists inside the vehicle, the vehicle monitoring system can perform the vehicle monitoring system action.

An example vehicle monitoring system action can include sending an alert, e.g., the alert 130, to one or more users, indicating that the child 105 is in a dangerous situation within the vehicle 110. The vehicle monitoring system can send an alert to a user device of a user associated with the vehicle, e.g., to the mobile phone 132 of the user 106. The alert can include, for example, a text message to a mobile phone, flashing lights, alarm sounds, and/or vibration alarms from a mobile phone, or an automatic phone call to a property, e.g., the property 102.

In some examples, the vehicle monitoring system action can include sending a first alert to a first user device associated with a first user associated with the vehicle. For example, the vehicle monitoring system can send the first alert to the mobile phone 132 associated with the user 106 of the vehicle 110.

After sending the first alert to the first user, the vehicle monitoring system may receive vehicle occupancy data that indicates continued presence of the vehicle occupant. For example, the vehicle monitoring system may receive vehicle occupancy data indicating that the weight detected by the car seat monitor 114 has not changed since sending the first alert. The vehicle occupancy data may include, for example, a vehicle occupant weight of forty pounds that is the same as the vehicle occupant weight detected prior to sending the first alert. The vehicle occupant weight being the same before and after sending the first alert indicates continued presence of the vehicle occupant.

The vehicle monitoring system can analyze the vehicle occupancy data that indicates continued presence of the vehicle occupant. Based on analyzing the vehicle occupancy data that indicates continued presence of the vehicle occupant, the vehicle monitoring system can send a second alert to the first user device. For example, the vehicle monitoring system can send a second alert to the mobile phone 132 associated with the user 106.

In some examples, the second alert may be the same type of alert as the first alert. For example, the first alert and the second alert may both include text messages send to the mobile phone 132. In some examples, the second alert may be different from the first alert. For example, the first alert may include a text message, and the second alert may include a telephone call.

Based on analyzing the vehicle occupancy data that indicates continued presence of the vehicle occupant, the vehicle monitoring system can send the second alert to a second user device associated with a second user associated with the vehicle. For example, the vehicle monitoring system can send the second alert to another driver of the vehicle 110 or to another resident of the property 102.

Based on analyzing the vehicle occupancy data that indicates continued presence of the vehicle occupant, the vehicle monitoring system can send the second alert to any electronic devices that are located within a preprogrammed distance to the vehicle and capable of receiving the second alert. For example, the vehicle monitoring system can send the second alert by broadcasting a distress signal within a designated radius.

In some examples, the vehicle monitoring system action can include sending a signal to a computer system of the vehicle to adjust one or more devices of the vehicle. For example, the vehicle monitoring system action can including the activation of automatic controls, e.g., the automatic controls 128. The automatic controls 128 can include, for example, garage door control, window control, engine control, climate control, security alarm control, headlight control, and autonomous operation. An example vehicle monitoring system action can be activating a beacon, e.g., the beacon 136. The beacon 136 can broadcast a distress signal to other devices within an area. Other example vehicle monitoring system actions can be activating an alarm at a property, e.g., the alarm 238, or sending a notification to security personnel, e.g., the security personnel 234. In some cases, the vehicle monitoring system can send a signal to the onboard computer 108 to adjust a window, a climate control system, a light, an alarm, an autonomous vehicle control system, or a garage door control system.

In response to determining that the vehicle occupant is unattended, the vehicle monitoring system can perform the vehicle monitoring system action. In some examples, the vehicle monitoring system can perform a particular vehicle monitoring system action based on the amount of time that the vehicle occupant has been unattended.

The vehicle monitoring system may be programmed to perform a first particular vehicle monitoring system action when the vehicle occupant has been unattended for a first period of time, and a second vehicle monitoring system action when the vehicle occupant has been unattended for a second period of time. For example, when the child 105 has been unattended for a first period of time of two minutes, the vehicle monitoring system may send a text message to the mobile phone 132 of the user 106. When the child 105 has been unattended for a second period of time of five minutes, the vehicle monitoring system may place a telephone call to the property 102.

In response to determining that a dangerous condition exists inside the vehicle, the vehicle monitoring system can perform the vehicle monitoring system action. In some examples, the vehicle monitoring system can perform a particular vehicle monitoring system action based on the amount of time that the dangerous condition has existed inside the vehicle.

The vehicle monitoring system may be programmed to perform a first particular vehicle monitoring system action when the dangerous condition has existed for a first period of time, and a second vehicle monitoring system action when the dangerous condition has existed for a second period of time. For example, when the carbon monoxide concentration has exceeded the threshold carbon monoxide concentration for one minute, the vehicle monitoring system may send a signal to the onboard computer 108 to operate a garage door controller to open a door of the garage 111. When the carbon monoxide concentration has exceeded the threshold carbon monoxide concentration for five minutes, the vehicle monitoring system may send an alert to emergency responders.

Figure 4:
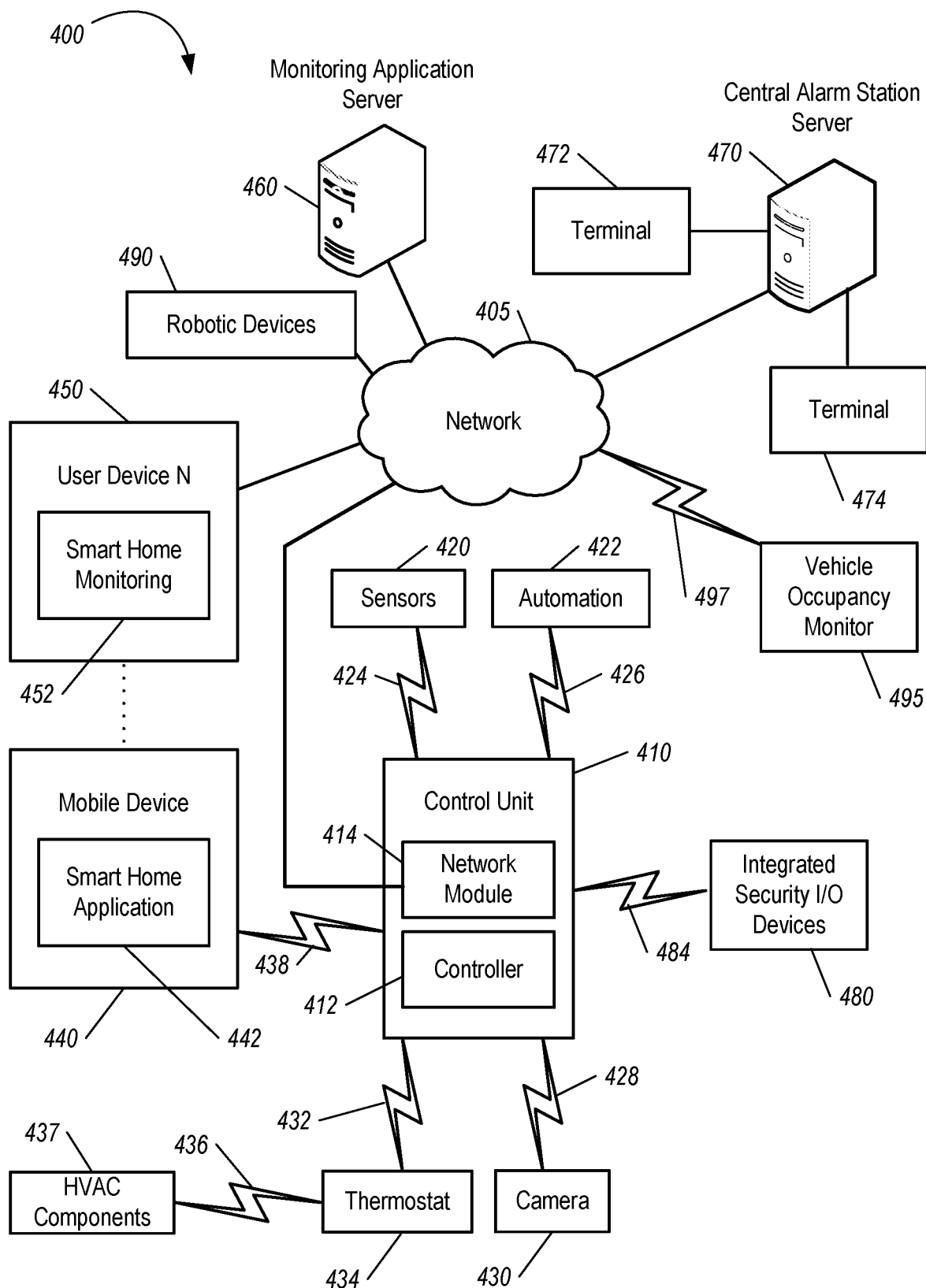
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 106). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The system 400 further includes a vehicle occupancy monitor 495 in communication with the control unit 410 through a communication link 497, which similarly to as described above in regards to communication links 424, 422, 428, 432, 438, and 484, may be wired or wireless and include a local network.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
obtaining first sensor data generated by one or more occupancy sensors integrated with a vehicle;
determining, using the first sensor data, that a living entity that is likely unable to exit the vehicle is inside the vehicle;
obtaining second sensor data generated by one or more environmental sensors integrated with the vehicle;
determining, using the second sensor data, that a dangerous condition likely exists inside the vehicle;
in response to determining that the living entity is inside the vehicle and that the dangerous condition likely exists inside the vehicle, performing one or more actions, including sending a first alert to a first device associated with a first person associated with the vehicle;
after sending the first alert to the first device, obtaining additional sensor data generated by the one or more occupancy sensors integrated with the vehicle;

determining, using the additional sensor data, that the living entity that is likely unable to exit the vehicle remains inside the vehicle; and in response to determining that the living entity that is likely unable to exit the vehicle remains inside the vehicle, performing one or more additional actions, including at least one of sending a second alert to the first device and sending an alert to a second device associated with a second person associated with the vehicle.

2. The computer-implemented method of claim 1, wherein:

the one or more occupancy sensors include a pressure sensor; and determining that the living entity is inside the vehicle includes determining that pressure data obtained from the pressure sensor represents a weight within a range of weights for the living entity.

3. The computer-implemented method of claim 1, wherein:

the one or more environmental sensors include a thermometer; and determining that the dangerous condition likely exists inside the vehicle includes determining that temperature data obtained from the thermometer represents a temperature within a range of dangerous temperatures.

4. The computer-implemented method of claim 1, wherein determining that the dangerous condition likely exists inside the vehicle includes determining that the living entity is the only occupant of the vehicle.

5. The computer-implemented method of claim 4, wherein determining that the dangerous condition likely exists inside the vehicle includes determining that a time duration for which the living entity has been the only occupant of the vehicle is at least a threshold time duration.

6. The computer-implemented method of claim 1, wherein performing the one or more actions includes sending a first alert to a first device associated with a first person associated with the vehicle, the method comprising:

after sending the first alert to the first device, obtaining additional sensor data generated by the one or more occupancy sensors integrated with the vehicle;

determining, using the additional sensor data, that the living entity remains inside the vehicle; and in response to determining that the living entity remains inside the vehicle, performing one or more additional actions.

7. The computer-implemented method of claim 6, wherein the one or more additional actions include at least one of sending a second alert to the first device and sending an alert to a second device associated with a second person associated with the vehicle.

8. The computer-implemented method of claim 1, wherein the one or more occupancy sensors include a camera including least one of a visible light camera, a thermal image camera, a LIDAR image camera, or an in-air SONAR image camera.

9. The computer-implemented method of claim 8, wherein determining that the living entity is inside the vehicle includes determining that an image captured by the camera depicts the living entity.

10. The computer-implemented method of claim 1, wherein the one or more occupancy sensors comprise at least one of a seat pressure sensor, a motion sensor, a microphone, or a camera.

11. The computer-implemented method of claim 1, wherein the one or more occupancy sensors includes a pressure sensor integrated with a car seat inside the vehicle.

12. The computer-implemented method of claim 1, wherein the one or more occupancy sensors includes an accelerometer integrated with a car seat inside the vehicle.

13. The computer-implemented method of claim 1, wherein the one or more environmental sensors comprise at least one of a thermometer, a carbon monoxide sensor, a vehicle door status sensor, a vehicle window status sensor, a vehicle ignition status sensor, or a vehicle speed sensor.

14. The computer-implemented method of claim 1, wherein the one or more actions comprise generating an alert for transmission through a wireless emergency alert network.

15. The computer-implemented method of claim 1, wherein the one or more actions comprise generating an alert for transmission to one or more of security personnel, emergency responders, or a business establishment, wherein transmission of the alert causes activation of a visual or audible alarm at a location of the at least one of the security personnel, the emergency responders, or the business establishment, wherein the location is within a designated radius to the vehicle.

16. The computer-implemented method of claim 1, wherein the one or more actions comprise at least one of activating a security alarm of the vehicle or flashing headlights of the vehicle.

17. The computer-implemented method of claim 1, wherein;

the one or more occupancy sensors includes a microphone; and determining that the living entity that is likely unable to exit the vehicle is inside the vehicle comprises determining that audio data obtained from the microphone represents a child's voice, including determining that audio frequencies in the audio data obtained from the microphone correspond to audio frequencies of the child's voice.

18. One or more non-transitory computer-readable media storing software comprising instructions executable by one or more computers which, upon such execution, cause the one or more computers to perform operations comprising:

obtaining first sensor data generated by one or more occupancy sensors integrated with a vehicle;

determining, using the first sensor data, that a living entity that is likely unable to exit the vehicle is inside the vehicle;

obtaining second sensor data generated by one or more environmental sensors integrated with the vehicle;

determining, using the second sensor data, that a dangerous condition likely exists inside the vehicle;

in response to determining that the living entity is inside the vehicle and that the dangerous condition likely exists inside the vehicle, performing one or more actions, including sending a first alert to a first device associated with a first person associated with the vehicle;

after sending the first alert to the first device, obtaining additional sensor data generated by the one or more occupancy sensors integrated with the vehicle;

determining, using the additional sensor data, that the living entity that is likely unable to exit the vehicle remains inside the vehicle; and in response to determining that the living entity that is likely unable to exit the vehicle remains inside the vehicle, performing one or more additional actions, including at least one of sending a second alert to the first device and sending an alert to a second device associated with a second person associated with the vehicle.

19. A system comprising:

one or more computers and one or more computer storage media storing instructions that are operable, when executed by the one or more computers, to cause the one or more computers to perform operations comprising:

obtaining first sensor data generated by one or more occupancy sensors integrated with a vehicle;

determining, using the first sensor data, that a living entity that is likely unable to exit the vehicle is inside the vehicle;

obtaining second sensor data generated by one or more environmental sensors integrated with the vehicle;

determining, using the second sensor data, that a dangerous condition likely exists inside the vehicle;

in response to determining that the living entity is inside the vehicle and that the dangerous condition likely exists inside the vehicle, performing one or more actions, including sending a first alert to a first device associated with a first person associated with the vehicle;

after sending the first alert to the first device, obtaining additional sensor data generated by the one or more occupancy sensors integrated with the vehicle;

determining, using the additional sensor data, that the living entity that is likely unable to exit the vehicle remains inside the vehicle; and in response to determining that the living entity that is likely unable to exit the vehicle remains inside the vehicle, performing one or more additional actions, including at least one of sending a second alert to the first device and sending an alert to a second device associated with a second person associated with the vehicle.

\* \* \* \* \*

UNITED STATES PATENT AND TRADEMARK OFFICE
CERTIFICATE OF CORRECTION

PATENT NO. : 12,330,574 B2
APPLICATION NO. : 18/232535
DATED : June 17, 2025
INVENTOR(S) : Beach et al.

Page 1 of 1

It is certified that error appears in the above-identified patent and that said Letters Patent is hereby corrected as shown below:

In the Claims

Column 29, Line 57, after "including" insert --at--; and

Column 30, Line 30, change "wherein;" to --wherein:--.

Signed and Sealed this
Ninth Day of September, 2025

Coke Morgan Stewart
*Acting Director of the United States Patent and Trademark Office*